Jan. 1, 1929.                    1,697,166
D. C. DAVIS
MAXIMUM DEMAND METER
Filed Jan. 5, 1924
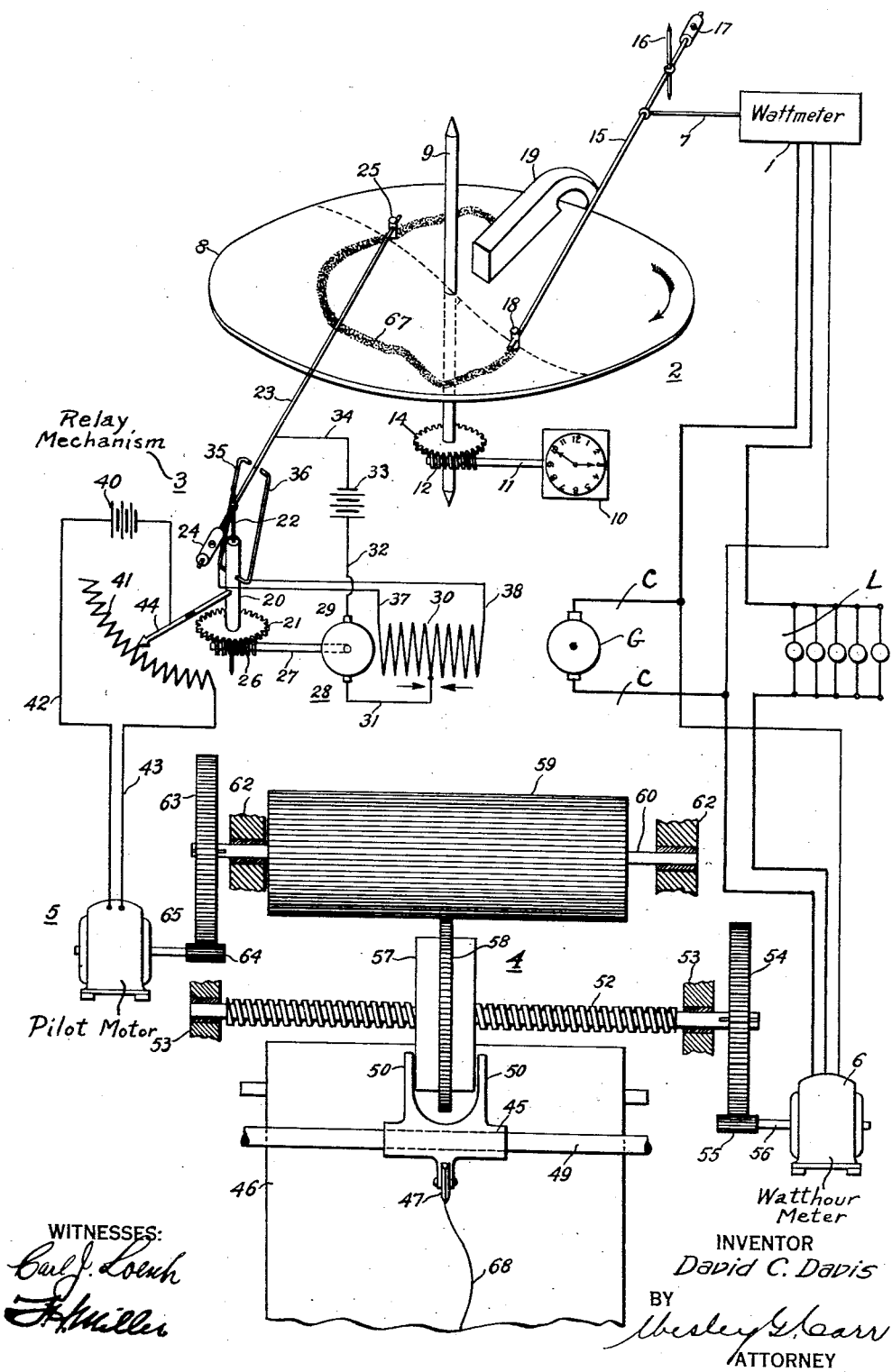
INVENTOR
David C. Davis Patented Jan. 1, 1929.

1,697,166

UNITED STATES PATENT OFFICE.

DAVID C. DAVIS, OF CHESTER, PENNSYLVANIA, ASSIGNOR TO WESTINGHOUSE ELECTRIC & MANUFACTURING COMPANY, A CORPORATION OF PENNSYLVANIA.

MAXIMUM DEMAND METER.

Application filed January 5, 1924. Serial No. 684,497.

My invention relates to electrical measuring instruments and particularly to maximum-demand meters.

One object of my invention is to provide a device of the above-indicated character that shall so record the average demand over predetermined intervals beginning at every instant as to permit the interval of greatest total sustained demand to be readily ascertained.

Another object of my invention is to provide a demand meter embodying a resetting means that shall operate continuously in accordance with the instant-to-instant variation in a previously changing quantity.

A further object of my invention is to provide means for electrically transmitting operating influences from a quantity-responsive device to an indicating member to affect the latter in accordance with variations in a quantity at predetermined time intervals after the occurrence of the variations.

Heretofore, instruments of several forms for indicating the maximum average demand of electrical circuits have been employed, including those which are adapted to record integrated demands over successive, non-overlapping intervals of fixed length. These instruments are ineffective in that the period of actual maximum average demand may begin at any time during one of said intervals, in which instance, the instrument will not record the period of maximum average demand. Attempts to remedy the above-mentioned objection have resulted in the construction of devices that are adapted to so subdivide the main interval into overlapping smaller intervals as to permit the observation of main intervals beginning at closely successive intervals. The latter devices have, to the best of my knowledge, all had mechanical limitations which prevented the sub-intervals being less than a certain length, such as a minute or a half minute. While this construction remedied the fault of the earlier instruments to a certain extent, it was subject to the same error to a smaller degree.

It is my aim to provide an instrument that shall be so electrically operated as to begin a new fixed main interval at every instant of its operation, so that the main interval of maximum average demand may be determined accurately, to the fraction of a second, if desired.

In practicing my invention, I provide means for effecting a trace, similar to a graphic curve, which represents the instant-to-instant integration of a quantity. Means is provided for co-operation with said trace at a point thereon that is, in point of time, at the terminus of a main interval, such as one half hour, from the point of effecting or inscribing the trace. This means operates electrically, through a relay mechanism, to operatively affect an indicating member or graphic stylus in one direction. This movement is opposed by a movement in proportion to the instant-to-instant integration of a quantity existing one-half hour later than each instant represented by the trace. Thus, a half hour period may be observed beginning at any instant and the half hour of active maximum average demand may be readily ascertained.

The single figure of the accompanying drawing is a semi-diagrammatic, semi-structural view of an instrument embodying my invention.

My invention may comprise, in general, a quantity-responsive element or wattmeter 1, a tracing mechanism 2, a relay mechanism 3, a graphic or indicating mechanism 4, a pilot motor 5 and a quantity-responsive element or watthour meter motor 6.

The wattmeter 1 comprises any usual or suitable instrument having an arm or member 7 actuated in accordance with the power traversing a circuit C from a generator G to a load L. Both the wattmeter 1 and the watthour meter motor 6 are energized from the same circuit C.

The tracing mechanism 2 comprises a disk 8, preferably of soft steel, that is fixed to a shaft 9 and rotated at a constant speed, as by a clock mechanism 10, through a shaft 11, a worm screw 12 and a worm gear wheel 14 on the shaft 9. An arm 15, mounted on a pivot shaft 16, and connected to the arm 7 of the wattmeter 1, is provided, at one end, with a permanent-magnet member 18. The latter is disposed to affect the disk 8. A permanent-magnet member 19 for wiping out the record on the disk 8 is disposed adjacent thereto and preferably slightly ahead of the zone of activity of the magnet 18.

The relay mechanism 3 comprises a shaft 20 having a worm-gear-wheel member 21 fixed thereto and an extension portion 22 of reduced diameter, at one end thereof. An arm 23, similar to the arm 15 and loosely pivoted on the extension 22, is provided, at one end, with a balance-weight member 24, and, at the other end, with a permanent-magnet member 25 disposed over and adjacent the disk 8. The gear wheel 21 engages a worm screw 26 that is mounted on a shaft 27 of a motor 28. The latter comprises an armature member 29 and a field-magnet winding 30. A conductor 31 is connected between one brush of the armature 29 and a mid-tap on the field-magnet winding 30. The other brush of the armature 29 is connected, through a conductor 32, a battery 33 and a conductor 34, to the arm 23.

Contact arm members 35 and 36, that are mounted in fixed positions on the shaft 20, have inwardly bent outer ends disposed normally in spaced relation to the arm 23 and are connected, by conductors 37 and 38, to the ends of the field-magnet winding 30. The arrangement of the motor 29, the contact members 35 and 36, and the arm 23 is similar to a Kelvin balance relay in which the arm 23 functions as a mid-contact member for engagement with one or the other of the contact members 35 and 36. Such engagement energizes the motor 28, through one half or the other of the field-magnet winding 30, to move the armature 29 in the one or the other direction.

The pilot motor 5, which is adapted to rotate in one direction only, is energized from a source 40, of electromotive force through a variable resistor 41 and conductors 42 and 43. A contact arm 44 is mounted in insulated relation to the shaft 20 and is adapted to be moved by the latter to vary the resistor 41.

The graphic recording or indicating mechanism 4 comprises a movable record sheet 46 that is adapted, in a usual manner, to pass under a pen or stylus 47. The latter may be mounted on a carriage member 45 that is adapted to slide along a suitably mounted rod 49 and is provided with laterally extending spaced arms 50. A screw shaft 52, mounted in bearings 53, extends parallel to the rod 49 and is provided, at one end, with a gear wheel 54 for engagement with a pinion 55. The latter is mounted on a shaft 56 of the meter motor 6. An internally screw threaded traveling nut member 57, is mounted on the screw-shaft 52 and is of such width as to substantially bridge the space between the arms 50, leaving enough space to permit its free rotation between the arms 50, and is provided, at its mid-portion, with an outer gear portion 58. The latter engages and elongated gear member 59 that is mounted on a shaft 60. The shaft 60 is mounted in bearings 62 and is provided, at one end, with a gear wheel 63 that engages a pinion 64 driven by a shaft 65 of the motor 5.

The wattmeter 1 and the motor meter 6 are adapted to be connected to the same circuit to be energized in accordance with the watts and the watthours, respectively, of the circuit. That is, the meter 1 is a torque meter that is merely deflected in accordance with the instantaneous power, and the meter 6 is continuously rotated in accordance with the energy traversing the circuit.

In operation, the disk 8, rotating at a constant rate of speed, has inscribed or imposed thereon a magnetic-flux trace or zone, represented by a shaded area 67, by the magnet 18. Since the magnet 18 is actuated by the wattmeter 1 and the disk 8 is actuated by the clock 10, the radius vector of the trace 67 will be proportional to the instantaneous value of the power.

The magnet 25, being attracted to the zone of the trace 67, will be moved, one half hour later, by the same amount as the magnet 18 was previously moved. The follower magnet will move the arm 23 about its pivot shaft 22 in accordance with the variations in the trace 67, and consequently, the relay mechanism 3 will be actuated, similar to a Kelvin-balance relay, to advance or retard the speed of the motor 5. Movement of the motor 5 is transmitted to the elongated gear member 59 to actuate the traveling nut 57 in one direction along the screw shaft 52. Movement of the meter motor 6 operates the screw shaft 52 to move the traveling nut 57 in the opposite direction.

Hence, a curve 68 inscribed by the pen 47 on the chart 46 will represent the average energy demand for half-hour intervals. Chronological markings, subdivided in very small units, may be provided on the chart 46 whereby the ends of any half hour period, no matter at what instant begun, may be located to determine the half hour of maximum average demand.

A volt-ampere meter may be substituted for the watt-meter 1, and a volt-ampere-hour meter may be substituted for the motor meter 6, to obtain the maximum average demand of apparent energy. Other modifications, including the substitution of electromagnets for the permanent magnets, 18, 19 and 25, may be effected within the spirit and scope of the invention.

While I have shown and described a particular form of my invention, changes may be effected therein without departing from the spirit and scope thereof, as set forth in the appended claims.

I claim as my invention:

1. A measuring instrument comprising an indicating device, means for actuating the same in one direction in accordance with certain values of a quantity and means for actuating the device in the opposite direction in accordance with other values of the quantity to indicate at all times the demand of said quantity for a predetermined period beginning at any instant.

2. A measuring instrument comprising an indicating device, means for actuating the same in one direction in accordance with a quantity integrated over a predetermined period and means for actuating the device in the opposite direction in accordance with the same quantity integrated over another identical period to indicate the demand for a predetermined period beginning at any instant.

3. A demand meter comprising indicating means and means including a magnetizable member for actuating the same to indicate the demand of a quantity being measured for a period of predetermined length beginning at any instant.

4. A measuring instrument comprising indicating means and a plurality of continuously operable differentially coacting means for actuating the same in accordance with the difference between the instantaneous rate of change of a quantity during a predetermined period and the instantaneous rate of change of the quantity during another identical period to indicate the demand for a predetermined period beginning at any instant.

5. A measuring instrument comprising a constant-speed element, a meter adapted to be energized from a circuit, means responsive to operation of the meter for effecting a trace on said element, means adapted to follow the trace a predetermined distance behind said trace-effecting means, indicating means, and means responsive to operation of said follower means for affecting said indicating means.

6. A measuring instrument comprising a constant-speed element, a meter adapted to be energized from a circuit, means responsive to operation of the meter for effecting a trace on said element, means adapted to follow the trace a predetermined distance behind said trace-effecting means, indicating means, means responsive to operation of said follower means for affecting said indicating means, and means for co-operatively affecting said indicating means.

7. A measuring instrument comprising indicating means, a constant-speed element, means effecting a trace on said element in accordance with the instantaneous values of a quantity existing during a predetermined period and means for actuating said indicating means differentially in accordance with the shape of said trace and the values of a quantity existing during corresponding instants in another identical period.

8. A measuring instrument comprising indicating means, magnetizable means, means for affecting said magnetizable means in accordance with instantaenous values of a quantity existing during a predetermined period and means co-operating with said magnetizable means to actuate said indicating means in accordance with the difference between values of another quantity existing during said period and the corresponding values of the latter quantity in another identical period.

9. A measuring instrument comprising indicating means, means including a member on which a trace is effected in accordance with instant-to-instant variations in the value of a quantity existing during a predetermined period, means operative in accordance with variations in said trace for actuating said indicating means in accordance with the difference between any instantaneous value of another quantity and the value of the latter quantity existing at a corresponding instant during another identical period, and means for removing portions of said trace after said indicating means has been operatively affected thereby and for preparing the member upon which tracing is effected for subsequently tracing.

10. A measuring instrument comprising a constant-speed, rotating magnetizable disk, a wattmeter adapted to be energized from a circuit, a magnet movable by said wattmeter to effect a magnetized trace on the disk, a control member adapted to follow the trace a predetermined distance behind said magnet, an indicating member, means responsive to movement of said control member for actuating the indicating member in one direction and means energized from said circuit for actuating the indicating member in the opposite direction.

11. A measuring instrument comprising a constant-speed element, a meter adapted to be energized from a circuit, means responsive to operation of the meter for effecting a trace on said element, means adapted to follow the trace a predetermined distance behind said trace-effecting means, indicating means, means responsive to operation of said follower means for affecting said indicating means, and means energized from said circuit for co-operatively affecting said indicating means.

12. In combination, indicating means, a meter element automatically operated at all times in accordance with the values of a quantity being measured and means for magnetically transmitting the indications of the meter element to said indicating means at predetermined time intervals after the occurrence thereof.

13. In combination, indicating means, and means responsive at all times to variations in a quantity and operative to magnetically transmit operating influence to the indicating means in accordance with said variations at predetermined time intervals after the occurrence thereof.

14. In combination, indicating means, means responsive at all times to variations in a quantity, and means affected by said variation-responsive means to magnetically transmit operating influences to the indicating means in accordance with said variations at predetermined time intervals after the occurrence thereof.

15. In combination, indicating means, a time responsive element including means responsive at all times to variations in a quantity, and means co-operating with said element and affected in accordance with said variations at predetermined time intervals after the occurrence thereof to magnetically transmit operation influences to the indicating means in accordance with said variations.

16. In combination, indicating means, a magnetizable time-responsive element, means for imposing magnetic flux on said element in accordance with variations in a quantity, and means responsive to said imposed flux for transmitting operating influences to the indicating means in accordance with said variations in predetermined subsequent time-phase relation to said time responsive element.

17. In combination, indicating means, a meter element automatically operated at all times in accordance with the values of a quantity being measured and means responsive to the operation of the meter element for magnetically transmitting the indications of the meter element to said indicating means at predetermined time intervals after the occurrence thereof.

In testimony whereof, I have hereunto subscribed my name this 28th day of December 1923.

DAVID C. DAVIS.